(12) United States Patent
Krishnamurthy et al.

(10) Patent No.: US 10,714,137 B1
(45) Date of Patent: Jul. 14, 2020

(54) NEAR-FIELD TRANSDUCER HAVING A PEG SURROUNDED BY A METAL APERTURE PLATE

(71) Applicant: Seagate Technology LLC, Cupertino, CA (US)

(72) Inventors: Vivek Krishnamurthy, Edina, MN (US); TaeWoo Lee, Eden Prairie, MN (US); Michael Allen Seigler, Eden Prairie, MN (US); Peng Zhang, Bloomington, MN (US); Martin Giles Blaber, Minneapolis, MN (US)

(73) Assignee: Seagate Technology LLC, Fremont, CA (US)

( * ) Notice: Subject to any disclaimer, the term of this patent is extended or adjusted under 35 U.S.C. 154(b) by 0 days.

(21) Appl. No.: 16/353,237

(22) Filed: Mar. 14, 2019

(51) Int. Cl.
| G11B 11/105 | (2006.01) |
| G11B 5/60 | (2006.01) |
| G11B 5/31 | (2006.01) |
| G11B 5/00 | (2006.01) |
| G11B 5/48 | (2006.01) |

(52) U.S. Cl.
CPC .......... *G11B 5/6088* (2013.01); *G11B 5/3116* (2013.01); *G11B 5/3136* (2013.01); *G11B 5/4866* (2013.01); *G11B 2005/0021* (2013.01)

(58) Field of Classification Search
None
See application file for complete search history.

(56) References Cited

U.S. PATENT DOCUMENTS

| 8,614,932 | B1* | 12/2013 | Sasaki | G11B 5/314 369/13.17 |
| 9,218,827 | B1* | 12/2015 | Sasaki | G11B 5/17 369/13.33 |
| 9,218,835 | B1* | 12/2015 | Sasaki | G11B 5/314 369/13.33 |
| 9,911,441 | B1* | 3/2018 | Jandric | G11B 5/314 369/13.33 |
| 10,115,423 | B1 | 10/2018 | Gubbins et al. | |
| 10,121,496 | B1 | 11/2018 | Peng et al. | |
| 10,186,292 | B1 | 1/2019 | Krishnamurthy et al. | |
| 2011/0181979 | A1* | 7/2011 | Jin | G11B 5/314 369/13.33 |
| 2011/0216635 | A1 | 9/2011 | Matsumoto | |
| 2013/0100783 | A1 | 4/2013 | Ostrowski et al. | |
| 2014/0254336 | A1* | 9/2014 | Jandric | G02B 6/1226 369/13.33 |
| 2015/0071044 | A1* | 3/2015 | Sasaki | G11B 13/08 369/13.17 |
| 2015/0117169 | A1* | 4/2015 | Kautzky | G11B 5/4866 369/13.33 |

(Continued)

*Primary Examiner* — Tan X Dinh
(74) *Attorney, Agent, or Firm* — Mueting Raasch Group (57) ABSTRACT

A recording head includes a waveguide core layer that delivers light from a light source to a region proximate a magnetic write pole. A near-field transducer that is formed of a thin metal film is deposited over the waveguide core layer. The near-field transducer includes an enlarged part with two straight edges facing a media-facing surface and at obtuse angles relative to the media-facing surface. A peg extends from the enlarged part towards the media-facing surface. The near-field transducer includes a metal aperture plate at the media-facing surface. The metal aperture plate surrounds at least three sides of the end of the peg.

20 Claims, 8 Drawing Sheets

(56) References Cited

U.S. PATENT DOCUMENTS

| | | | | |
|---|---|---|---|---|
| 2015/0262593 A1* | 9/2015 | Sasaki | ............... | G11B 5/314 |
| | | | | 369/13.17 |
| 2015/0325261 A1* | 11/2015 | Yang | ............... | G11B 5/3133 |
| | | | | 369/13.33 |
| 2017/0249962 A1* | 8/2017 | Peng | ............... | G11B 5/6088 |
| | | | | 369/13.33 |
| 2018/0096702 A1* | 4/2018 | Staffaroni | ......... | G11B 5/4866 |
| | | | | 369/13.33 |

\* cited by examiner

NEAR-FIELD TRANSDUCER HAVING A PEG SURROUNDED BY A METAL APERTURE PLATE

SUMMARY

The present disclosure is directed to a near-field transducer having a peg partially surrounded by an aperture plate. In one embodiment, a recording head includes a waveguide core layer that delivers light from a light source to a region proximate a magnetic write pole. A near-field transducer that is formed of a thin metal film is deposited over the waveguide core layer. The near-field transducer includes an enlarged part with two straight edges facing a media-facing surface and at obtuse angles relative to the media-facing surface. A peg extends from the enlarged part towards the media-facing surface. The near-field transducer includes a metal aperture plate at the media-facing surface. The metal aperture plate surrounds at least three sides of the end of the peg.

In another embodiment, a method involves illuminating a waveguide core layer that delivers light to a region proximate a near-field transducer and a magnetic write pole. Surface plasmons are excited at an enlarged part of the near-field transducer in response to the light. The near-field transducer is formed of a thin metal film deposited over the waveguide core layer. The enlarged part has two straight edges facing a media-facing surface and at obtuse angles relative to the media-facing surface. The surface plasmons are directed to a peg extending from the enlarged part towards the media-facing surface. Optical intensity of the surface plasmons are enhanced via a metal aperture plate at the media-facing surface. The metal aperture plate surrounds at least three sides of the end of the peg.

These and other features and aspects of various embodiments may be understood in view of the following detailed discussion and accompanying drawings.

BRIEF DESCRIPTION OF THE DRAWINGS

The discussion below makes reference to the following figures, wherein the same reference number may be used to identify the similar/same component in multiple figures.

DETAILED DESCRIPTION

The present disclosure is generally related to heat-assisted magnetic recording (HAMR), also referred to as energy-assisted magnetic recording (EAMR), thermally-assisted recording (TAR), thermally-assisted magnetic recording (TAMR), etc. In a HAMR device, a near-field transducer (NFT) concentrates optical energy into a tiny optical spot in a recording layer, which raises the media temperature locally, reducing the writing magnetic field required for high-density recording. A waveguide delivers light to the near-field transducer and illuminates the near-field transducer. In response to the illumination, the near-field transducer generates surface plasmons that are directed (via the shape of the transducer) out of the recording head to create the hotspot on the recording medium.

One challenge in developing in HAMR products involve unpredictable lifetime of the drives. One cause for this is separation of NFT parts and voiding within regions of the NFT. Also, in order to meet linear density specs, the writer designs may include many optical elements proximate the NFT that can produce potential weak interfaces between different materials, as well as being complex to manufacture.

A HAMR write transducer described herein uses a relatively simple structure that can formed from the same material for most or all of the NFT. This avoids multi-material interfaces that may generate hotspots. Such a design can achieve high thermal gradient (TG), low temperature and good power efficiency. Further, the design can also be incorporated with flat magnetic pole to increase the magnetic field.

Figure 1:
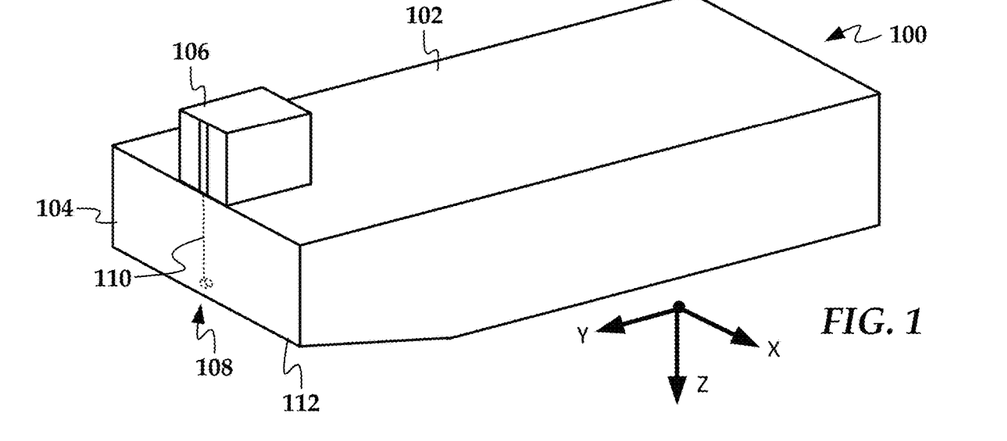
FIG. 1 is a perspective view of a slider assembly according to an example embodiment.

In reference now to FIG. 1, a perspective view shows a read/write head 100 according to an example embodiment. The read/write head 100 may be used in a magnetic data storage device, e.g., HAMR hard disk drive. The read/write head 100 may also be referred to herein interchangeably as a slider, head, write head, read head, recording head, etc. The read/write head 100 has a slider body 102 with read/write transducers 108 at a trailing edge 104 that are held proximate to a surface of a magnetic recording medium (not shown), e.g., a magnetic disk.

The illustrated read/write head 100 is configured as a HAMR device, and so includes additional components that form a hot spot on the recording medium near the read/write transducers 108. These HAMR components include an energy source 106 (e.g., laser diode) and a waveguide 110. The waveguide 110 delivers electromagnetic energy from the energy source 106 to a near-field transducer (NFT) that is part of the read/write transducers 108. The NFT achieves surface plasmon resonance and directs the energy out of a media-facing surface 112 (also referred to as the air-bearing surface, or ABS) to create a small hot spot in the recording medium.

Figure 2:
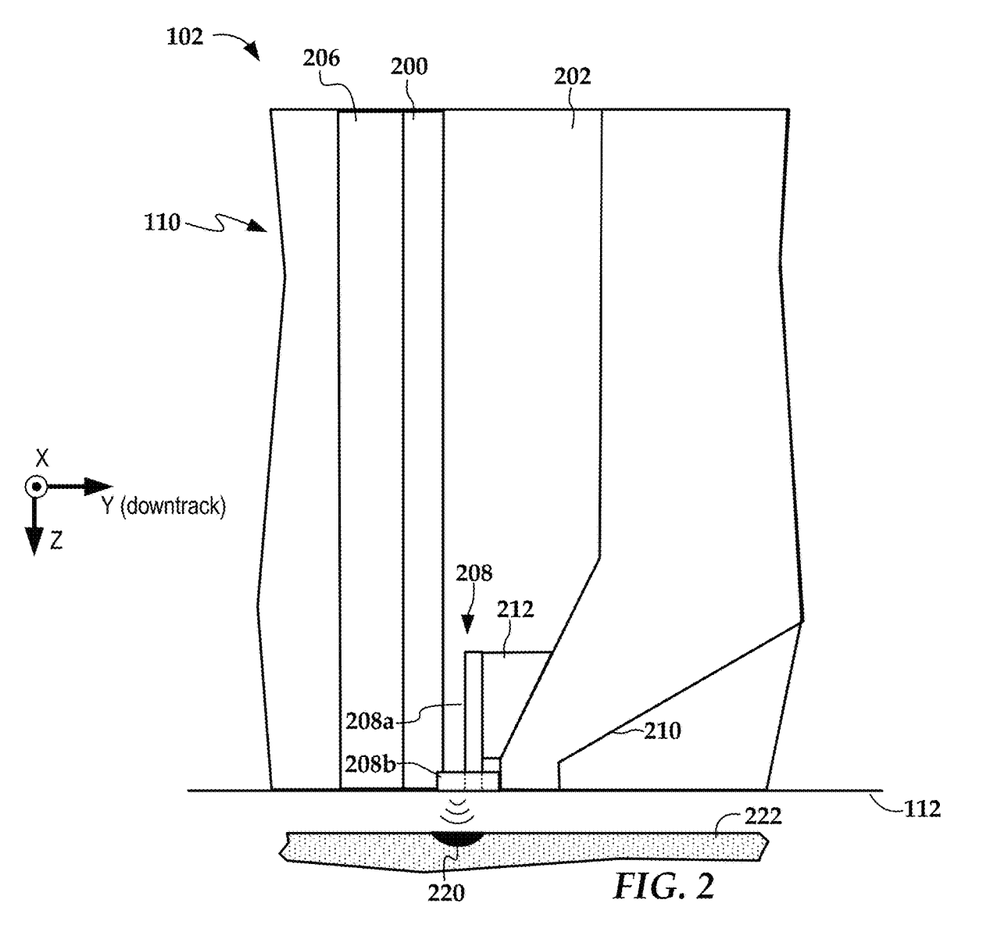
FIG. 2 is a cross-sectional view of a slider along a down-track plane according to an example embodiment.

In FIG. 2, a cross-sectional view shows details of a slider body 102 according to an example embodiment. As best seen in FIG. 2, the waveguide 110 includes a core 200, top cladding layer 202, and bottom cladding 206. The NFT 208 is placed near the waveguide core 200. The core 200 delivers light to the NFT 208, which is located within or near the top cladding layer 202 at the media-facing surface 112. The cladding layers 202, 206 are each formed of a dielectric material having a refractive index lower than the core 200.

The NFT 208 includes two parts: a main body 208a that includes an enlarged part and a peg that extends towards the media-facing surface 112; and an aperture plate 208b that surrounds part of the peg at the media-facing surface 112. A write pole 210 is located near the NFT 208. A heat sink 212 cools the NFT 208. A magnetic coil (not shown) induces a magnetic field through the write pole 210 in response to an applied current. During recording, the NFT 208 forms a hotspot 220 within a recording layer of a moving recording medium 222. The write pole 210 sets a magnetic orientation in the hotspot 220, thereby writing data to the recording medium.

Figure 3:
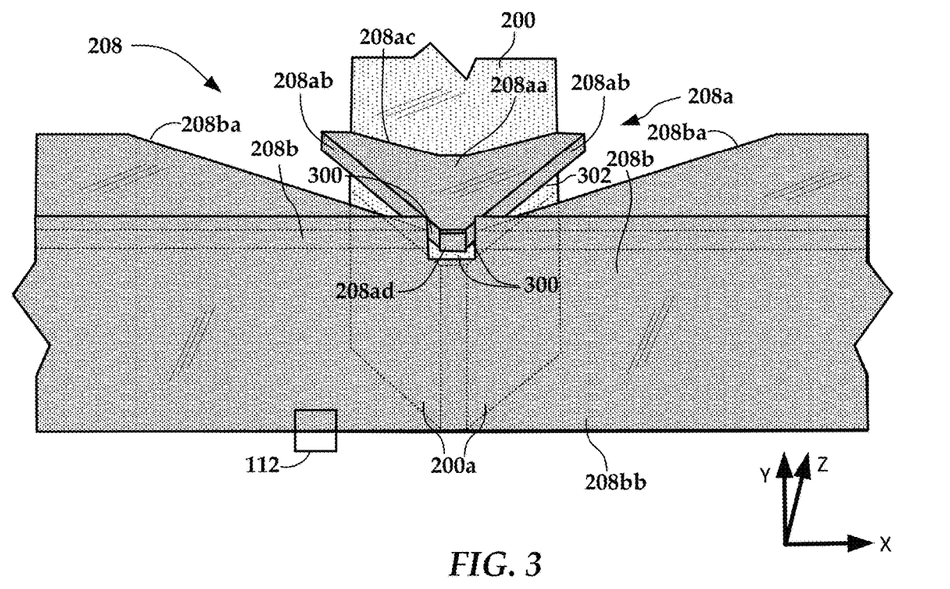
FIG. 3 is a perspective view of a near-field transducer and waveguide according to an example embodiment.
Figure 4:
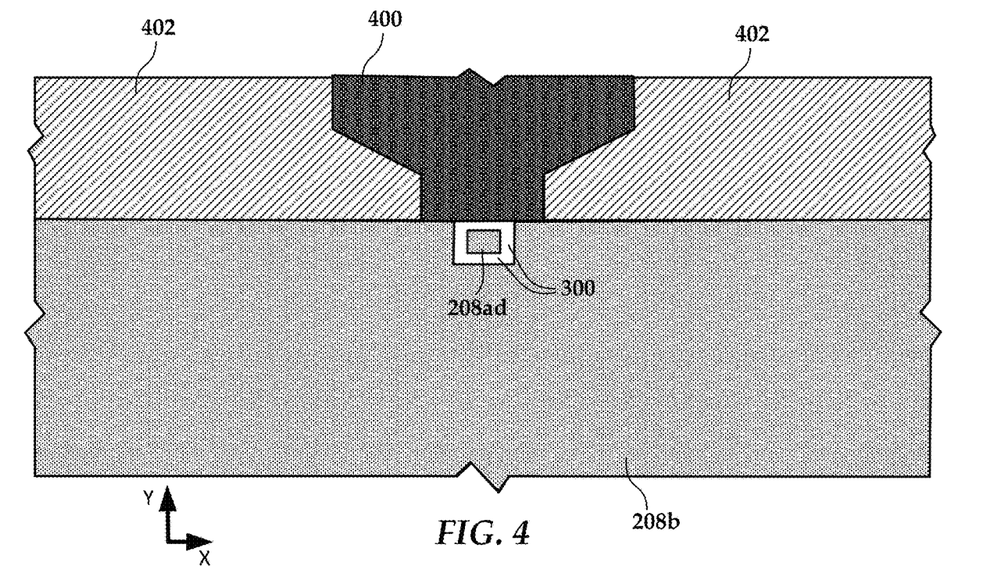
FIG. 4 is a media-facing-surface-view of the near-field transducer shown in FIG. 3.

In FIGS. 3 and 4, perspective and ABS views show details of the NFT 208 according to an example embodiment. The waveguide core layer 200 delivers light from a light source to a region proximate a magnetic write pole (see write pole 400 in FIG. 4). The main body 208a of the near-field transducer 208 is formed of a thin film of Rh or Ir (or other mechanically and thermally robust metal) that is deposited over the waveguide core layer 200. The main body 208a includes an enlarged part 208aa with two straight edges 208ab facing the media-facing surface 112 and at obtuse angles relative to the media-facing surface 112. In this example, the enlarged part 208a includes a side 208ac that faces away from the media-facing surface 112 and is configured as a concave depression. In other configurations, the side 208ac may be a convex bulge or a flat edge.

A peg 208ad extends from the enlarged part 208aa towards the media-facing surface 112. For example, in this embodiment, the waveguide core layer 200 has a terminating end with terminating edges 200a that align with the two straight edges 208ab of the near-field transducer 208. In other embodiments, these edges 200a may not align with the edges 208ab, instead edges 200a can be straight without tapering or at an angle different than the angle of edges 208ab or may be a single terminating edge parallel or at a non-zero angle to the media-facing surface 112, for easing the manufacturing process. Surrounding three sides of the peg 208ad (e.g., two crosstrack sides and one downtrack side) near the media-facing surface 112 is the aperture plate 208b. Gaps 300 separate the aperture plate 208b and the peg 208ad. The gaps 300 can be filled with a dielectric, as are regions surrounding the rest of the NFT 208 and the waveguide core 200. This dielectric may have a different index of refraction than the waveguide core 200, e.g., configured as cladding with lower index of refraction than that of the core 200. Further, a thin layer 302 of the cladding material (e.g., ~10-50 nm) may be located between the NFT 208 and the core 200.

As seen in FIG. 4, the write pole covers a fourth side of the peg 208ad at the media-facing surface 112. A block of material 402 made of material such as Au may surround the crosstrack sides of the write pole 400. The block 402 may be provided to heat-sink the write pole 400 and NFT 208. In order to increase coupling to the NFT 208, the aperture plate 208b may include angled edges 208ba (see FIG. 3) that focus the light back towards the NFT 208. In some embodiments these edges 208ab may be part of a structure separate from the aperture plate 208b. As seen in FIG. 4, the aperture plate 208b may extend in a downtrack direction a significant distance in order to block stray light from reaching the recording media. As indicated by the shading, the NFT main body 208a and aperture plate 208b may be formed of the same material, such as Rh or Ir.

The downtrack dimension (y-direction) of the peg 208ad may be around 20-40 nm, and in one configuration an optimal downtrack dimension is around 30 nm. The length of the peg 208d (z-direction) may be around 15-20 nm. An analysis shows the aperture plate 208ba improves cross-track thermal gradient of the recording hotspot to improve by around 10% compared to a similar design without the aperture plate.

Figure 5:
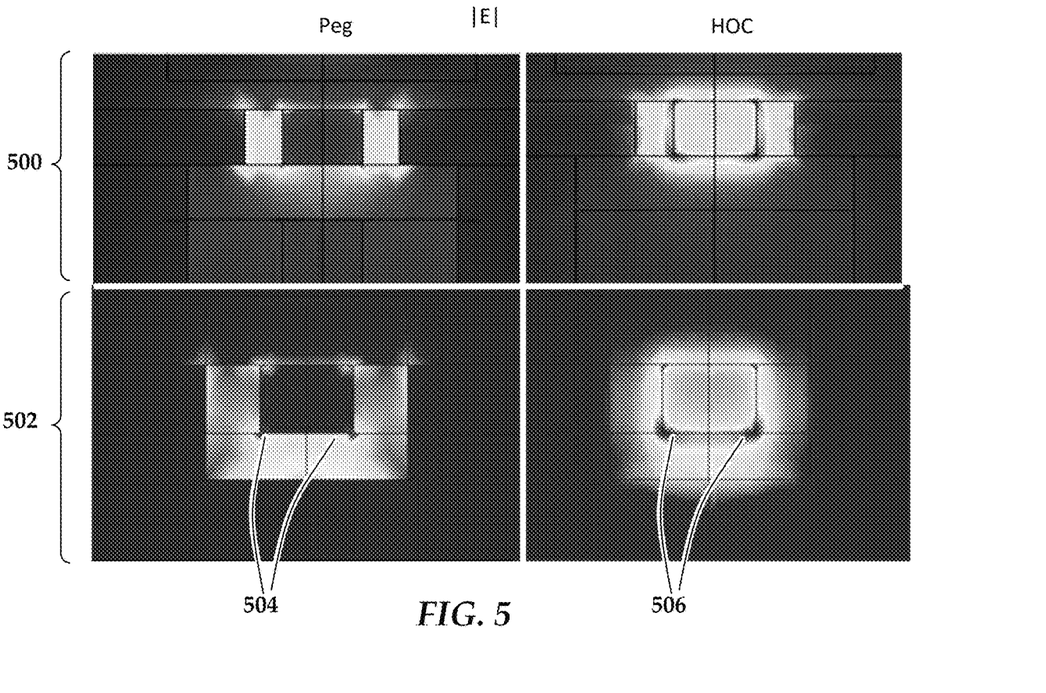
FIGS. 5 and 6 are plots showing results of a simulation of a near-field transducer according to an example embodiment.

In FIG. 5, plots show an analysis of the effects of the aperture plate on electric field at the peg and at the head overcoat layer (HOC). The top images 500 are analysis results for a peg with only cross-track side shields and the bottom images 502 are analysis results for a peg with an aperture plate that surrounds three sides. As indicated by maximum field regions 504, 506, the aperture plate shifts the field profile to be concentrated along a down-track edge of the peg facing away from the write pole.

Figure 6:
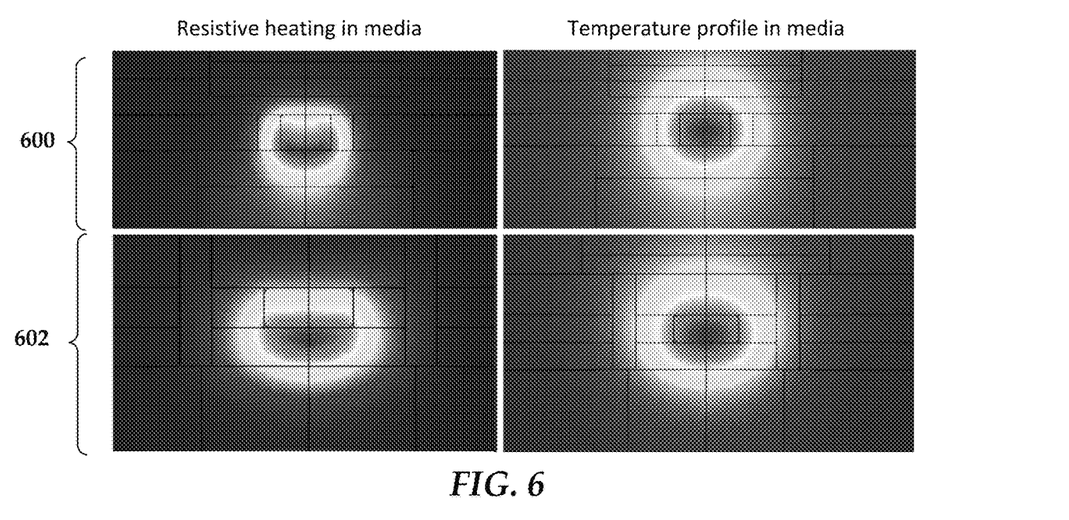

In FIG. 6, plots show an analysis of the effects of the aperture plate on resistive heating and temperature in the media. The top images 600 are analysis results for a peg with only cross-track side shields and the bottom images 602 are analysis results for a peg with an aperture plate that surrounds three sides. Note that the peg geometries are different for the two cases 600, 602, with the latter having a larger cross-track width relative to down-track thickness. This reduction in the down-track thickness can help increase down-track TG.

Generally, the analysis results above have found that the use of an aperture plate with this type of NFT increases cross-track TG and significantly reduces background light emitted to the recording media. If an external-cavity laser configuration, with aperture plate as the external reflector is used, then the blocked background light can be recycled or reflected to contribute to improving laser efficiency. So, with an external cavity laser configuration, entire slider is part of the laser and hence laser instability is completely mitigated.

Figure 7:
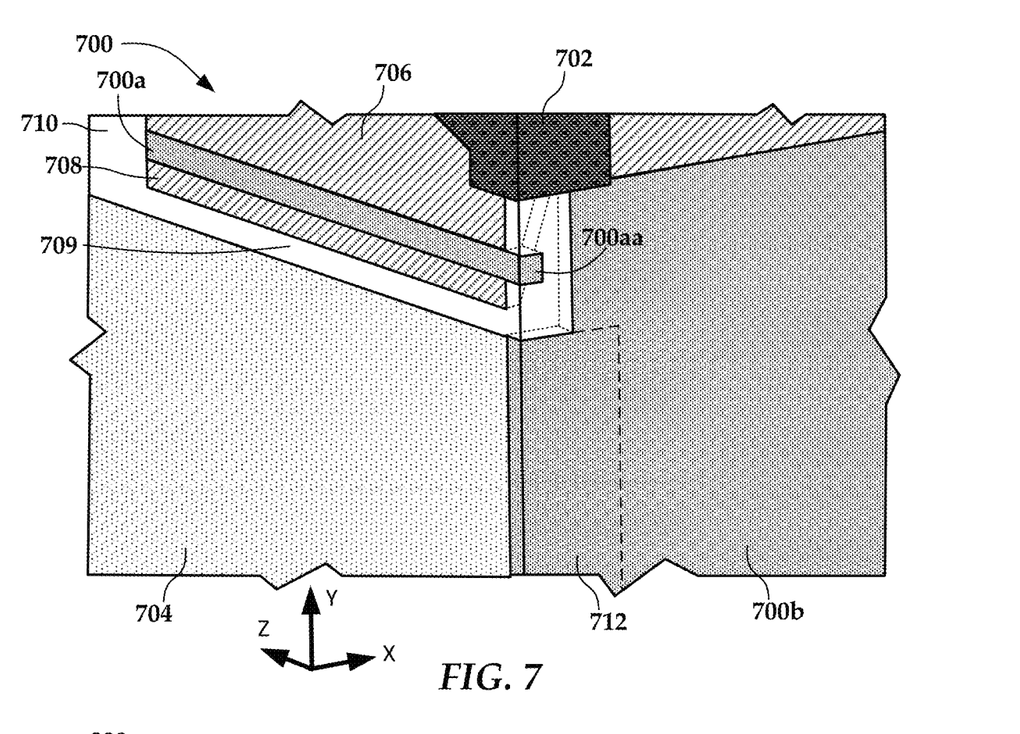
FIGS. 7, 8, and 9 perspective views of a near-field transducer and waveguide according to additional embodiments.

In FIG. 7, a cross-sectional view shows features of an NFT 700 according to another example embodiment. The NFT includes a main body 700a and aperture plate 700b having geometry, features, and material compositions as previously shown in FIGS. 3 and 4 and described above. Also seen in this view is a write pole 702 and waveguide core 704, also having geometry, features, and material compositions as previously shown in FIGS. 3 and 4 and described above. A heat sink 706 made, e.g., from Au, thermally couples the main body 700a to the write pole 702.

This example embodiment includes a thin layer 708 of thermally conductive material, e.g., Au, Ag, Cu, etc., which is also referred to herein as a bilayer design. The layer 708 has a shape in the xz-plane that matches that of the main body 700a excluding the peg 700aa, e.g., a triangular or arrow shape. A layer 709 of dielectric material 710 (e.g., cladding material) separates the layer 708 from the waveguide core 704, and also surrounds the peg 700aa at the media-facing surface. The layer 709 is estimated to lower the peg temperature by ~75° C. and hence improves reliability of the head. This may incur a small penalty for cross-track TG. However, this can be offset by decreasing the y-direction thickness of the peg 700aa, e.g., to about 20 nm. Note that this layer can be used in implementations without the illustrated aperture plate 700b. For example, region 712 (bounded by the dashed lines) can be filled with a dielectric material, e.g., such as dielectric cladding material 710.

Figure 8:
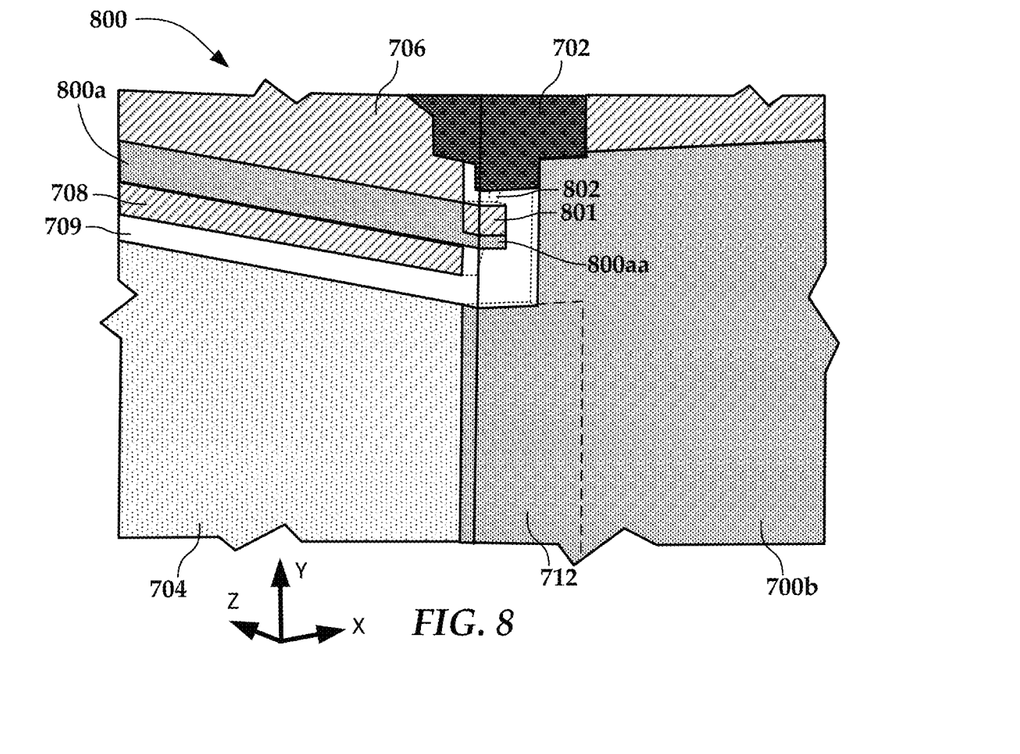

In FIG. 8, a cross-sectional view shows additional features of an NFT 800 according to another example embodiment. For purposes of convenience, the same reference numbers from FIG. 7 are used to denote analogous components in FIG. 8, although in practice there may be some differences, e.g., geometry, materials, between the two embodiments. In this example, a peg cap 801 is located between the peg 800aa of the NFT 800 and the write pole 702. A dielectric-filled gap 802 separates the cap 801 from the write pole. The cap 801 may be made from a thermally conductive material, e.g., Au, Ag, Cu, etc. Note that in this example, the peg 800aa has a downtrack thickness that is less than that of the rest of the main body 800a. The cap 801 can be used with or without an aperture plate 700b that covers three sides, as indicated by optional dielectric region 712.

Among other things, the cap 801 helps to lower the temperature of the peg 800aa. This cooling may have benefits such as reducing oxidation rate. The cap 801 can also improve TG and reduce curvature of the thermal spot. A circular thermal spot on the recording media will have highest curvature and rectangular thermal spot on the rectangular media will have lowest curvature. Having the Au cap 801 reduces the curvature, making the thermal more rectangular, which improves recording performance. If the cap 801 is made of Au, it may recess from the media-facing surface over time. However, the peg 800aa, which is made from a more mechanically robust material such as Ir or Rh, won't recess, thereby maintaining consistent writing performance over the life of the recording head.

Figure 9:
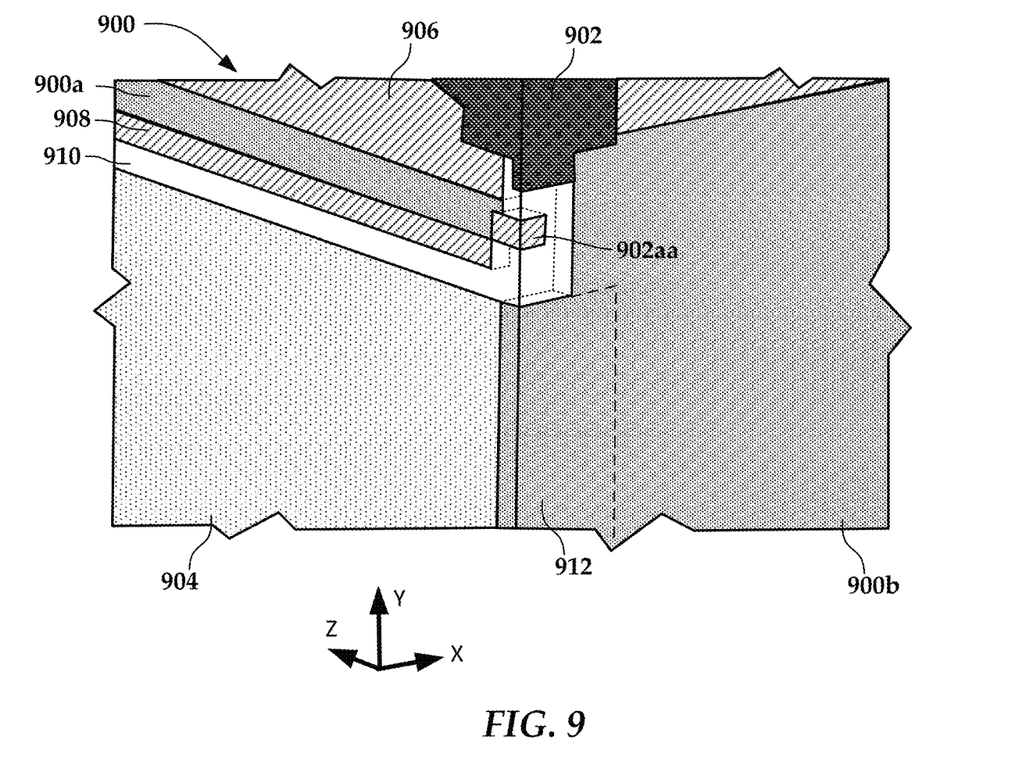
Figure 10:
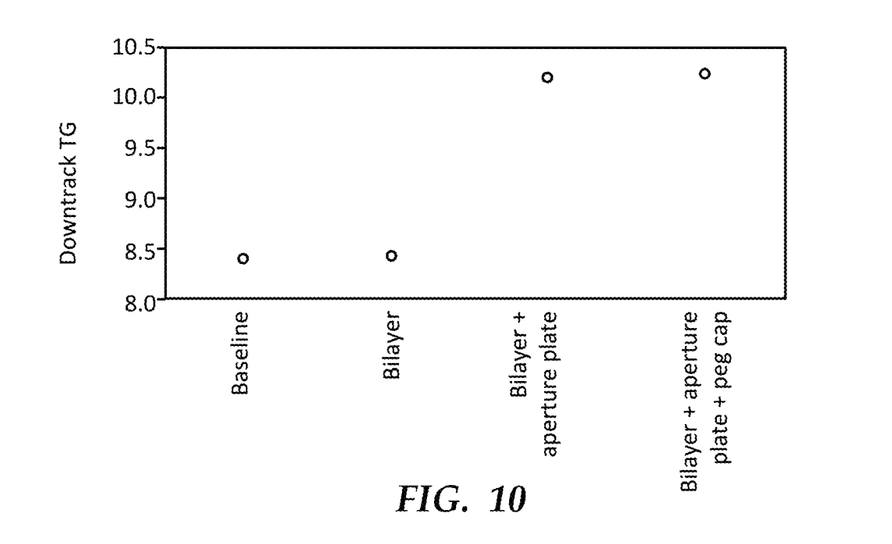
FIGS. 10, 11, 12, 13, and 14 are graphs comparing simulation of various near-field transducer configurations.
Figure 11:
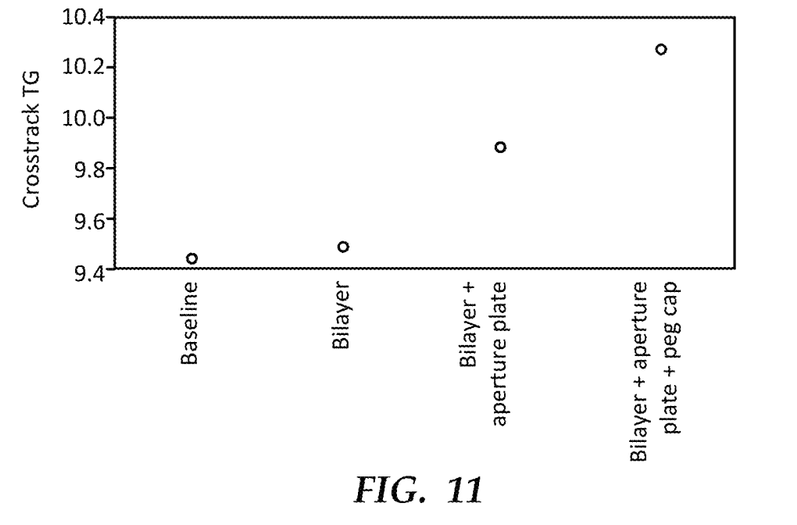
Figure 12:
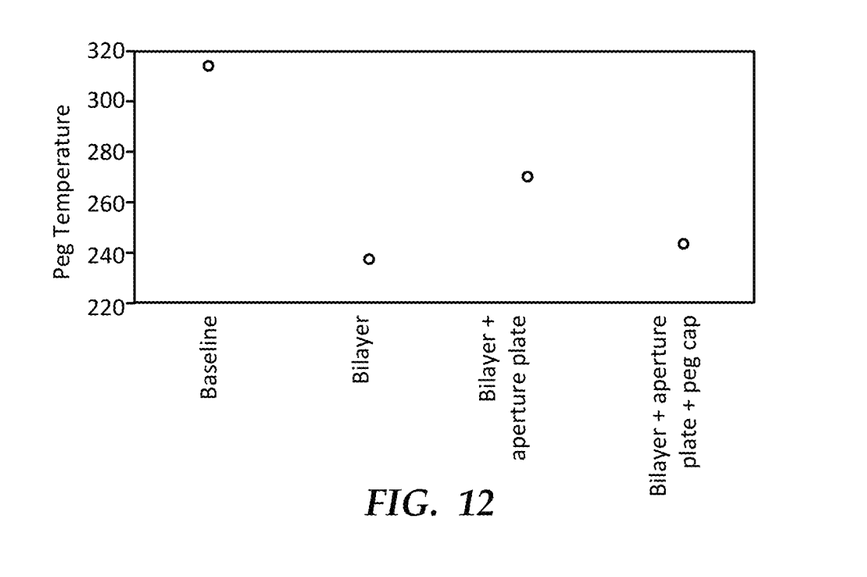
Figure 13:
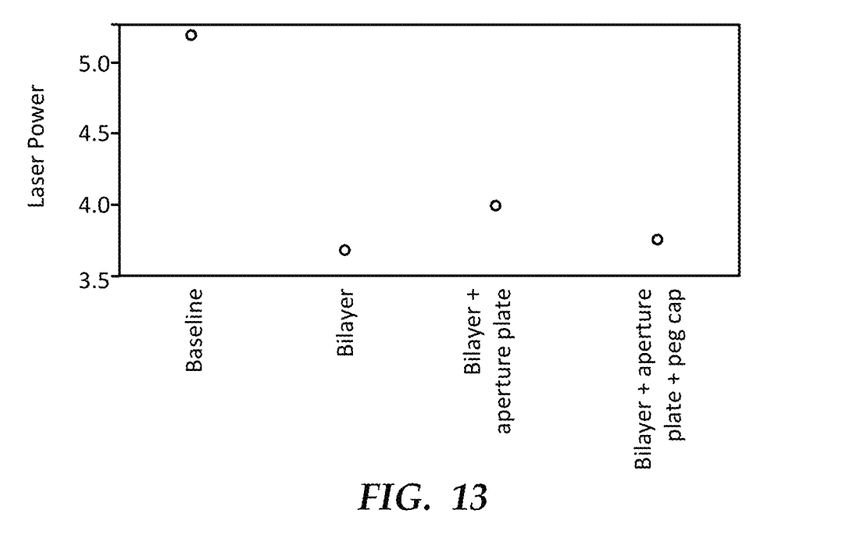
Figure 14:
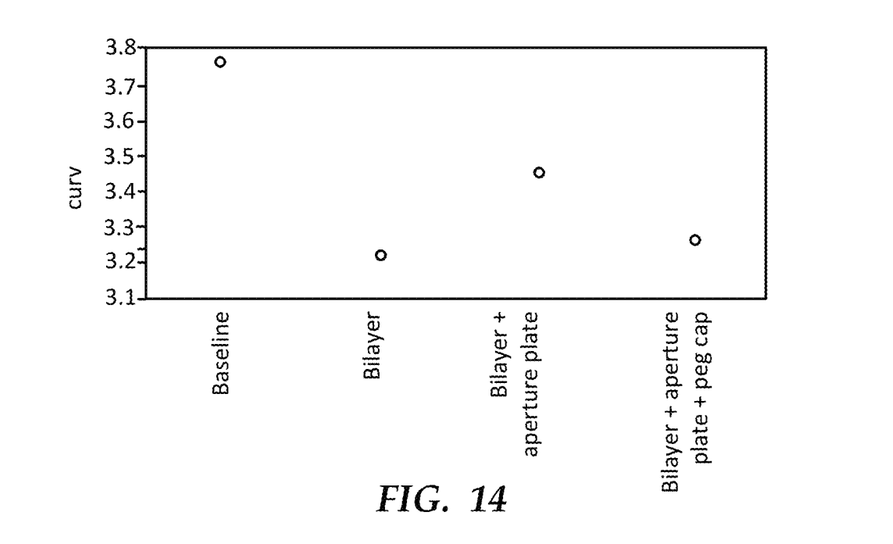

In FIG. 9, a cross-sectional view shows features of an NFT 900 according to another example embodiment. The NFT includes a main body 900a and aperture plate 900b having geometry, features, and material compositions as previously shown in FIGS. 3 and 4 and described above. Also seen in this view is a write pole 902 and waveguide core 904, also having geometry, features, and material compositions as previously shown in FIGS. 3 and 4 and described above. A heat sink 906 made, e.g., from Au, thermally couples the main body 900a to the write pole 902.

This embodiment may optionally include a thin layer 908 of thermally conductive material, e.g., Au, Ag, Cu, etc. The layer 908 has a shape in the xz-plane that matches that of the main body 900a excluding the peg 900aa, e.g., a triangular or arrowhead shape. A layer of dielectric material 910 (e.g., cladding material) separates the layer 908 from the waveguide core 904. This embodiment may also be used without the aperture plate 900b, e.g., region 912 being filled with a dielectric such as material 910.

The peg 908aa in this example is made from Au. Compared to the embodiments described above, this embodiment is predicted to have high cross-track TG, relatively low temperature, lowest laser power needed, and lowest adjacent track erasure compared to other designs described above. In order to reduce recession of the peg 908aa during use, the Au can be annealed to a final state during manufacture. This should prevent any further deformation during operation. The Au-peg 908aa has another advantage of being oxidation-resistant.

In FIGS. 10-14, graphs show analysis that compare performance of the various designs. The baseline is an NFT similar to what is shown in FIG. 3, but without an aperture plate. The addition of the bilayer (e.g., layer 708 in FIG. 7) reduces peg temperature. The addition of the aperture plate improves both downtrack and crosstrack TGs and increases peg temperature. The Au peg cap (e.g., cap 801) decreases peg temperature and improves crosstrack TG and curvature.

Figure 15:
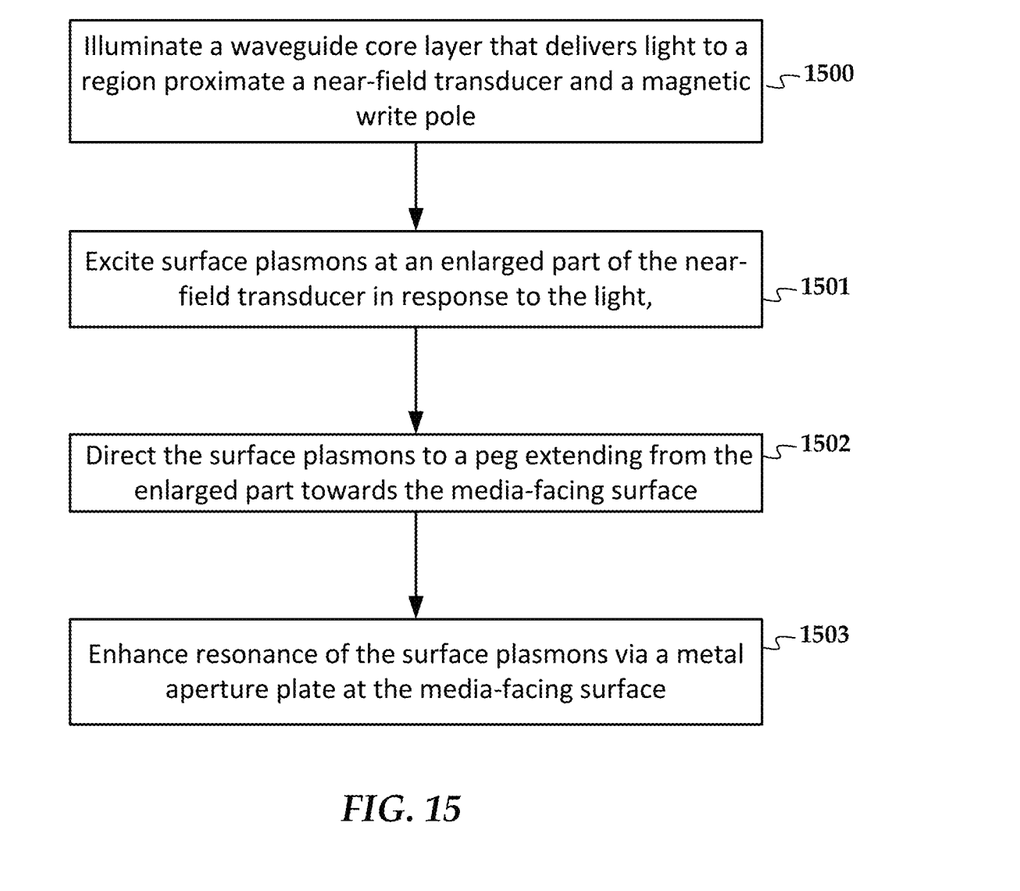
FIG. 15 is a flowchart of a method according to an example embodiment.

In FIG. 15, a flowchart shows a method according to an example embodiment. The method involves illuminating 1500 a waveguide core layer that delivers light to a region proximate a near-field transducer and a magnetic write pole. Surface plasmons are excited 1501 at an enlarged part of the near-field transducer in response to the light. The near-field transducer is formed of a thin metal film deposited over the waveguide core layer. The enlarged part has two straight edges facing a media-facing surface and at obtuse angles relative to the media-facing surface. The surface plasmons are directed 1502 (e.g., due to the shape of the enlarged part) to a peg extending from the enlarged part towards the media-facing surface. The optical intensity of the surface plasmons is enhanced 1503 via a metal aperture plate at the media-facing surface. The metal aperture plate surrounds at least three sides of the end of the peg.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g. 1 to 5 includes 1, 1.5, 2, 2.75, 3, 3.80, 4, and 5) and any range within that range.

The foregoing description of the example embodiments has been presented for the purposes of illustration and description. It is not intended to be exhaustive or to limit the embodiments to the precise form disclosed. Many modifications and variations are possible in light of the above teaching. Any or all features of the disclosed embodiments can be applied individually or in any combination are not meant to be limiting, but purely illustrative. It is intended that the scope of the invention be limited not with this detailed description, but rather determined by the claims appended hereto.

What is claimed is:

1. A recording head, comprising:
 a waveguide core layer that delivers light from a light source to a region proximate a magnetic write pole;
 a near-field transducer formed of a thin metal film deposited over the waveguide core layer, the near-field transducer comprising:
  an enlarged part with two straight edges facing a media-facing surface and at obtuse angles relative to the media-facing surface;
  a peg extending from the enlarged part towards the media-facing surface, and end of the peg parallel to the media-facing surface; and
 a metal aperture plate at the media-facing surface, the metal aperture plate contiguously surrounding at least three sides of the end of the peg, the magnetic write pole surrounding a fourth side of the peg, the metal aperture plate shifting an electric field profile of the peg to be concentrated along a downtrack edge of the peg facing away from the write pole.

2. The recording head of claim 1, wherein the enlarged part of the near-field transducer is separated from the waveguide core layer by a layer of dielectric cladding between 10 and 50 nm thick.

3. The recording head of claim 1, wherein the thin metal film comprises Rh or Ir.

4. The recording head of claim 3, wherein the recording head further comprises a layer of Au between the thin metal film and the waveguide core, the layer of gold having a shape corresponding to that of the enlarged part and not extending to the peg.

5. The recording head of claim 3, wherein the peg has a downtrack dimension that is less than a corresponding downtrack dimension of the enlarged part, the recording head further comprising an Au cap on a downtrack side of the peg facing the write pole.

6. The recording head of claim 1, wherein the peg has a downtrack dimension that is less than a corresponding downtrack dimension of the enlarged part, the recording head further comprising an Au cap on a downtrack side of the peg facing the write pole.

7. The recording head of claim 1, wherein the peg is formed of Au.

8. The recording head of claim 1, wherein a dielectric fills in gaps between the peg and the metal aperture plate.

9. A recording head, comprising:
- a waveguide core layer that delivers light from a light source to a region proximate a magnetic write pole;
- a near-field transducer formed of a thin metal film deposited over the waveguide core layer, the near-field transducer comprising:
  - an enlarged part with two straight edges facing a media-facing surface and at obtuse angles relative to the media-facing surface;
  - a peg extending from the enlarged part towards the media-facing surface, and end of the peg parallel to the media-facing surface;
  - a layer of Au between the thin metal film and the waveguide core, the layer of gold having a shape corresponding to that of the enlarged part; and
  - a metal aperture plate at the media-facing surface, the metal aperture plate surrounding at least two sides of the end of the peg.

10. The recording head of claim 9, wherein the thin metal film comprises Rh or Ir.

11. The recording head of claim 9, wherein the peg has a downtrack dimension that is less than a corresponding downtrack dimension of the enlarged part, the recording head further comprising an Au cap on a downtrack side of the peg facing the write pole.

12. The recording head of claim 9, wherein the peg is formed of Au.

13. The recording head of claim 9, wherein the metal aperture plate surrounds at least three sides of the end of the peg.

14. The recording head of claim 13, wherein the write pole surrounds a fourth side of the peg.

15. The recording head of claim 9, wherein a dielectric fills in gaps between the peg and the metal aperture plate.

16. A method comprising:
- illuminating a waveguide core layer that delivers light to a region proximate a near-field transducer and a magnetic write pole;
- excite surface plasmons at an enlarged part of the near-field transducer in response to the light, the near-field transducer formed of a thin metal film deposited over the waveguide core layer, the enlarged part having two straight edges facing a media-facing surface and at obtuse angles relative to the media-facing surface;
- directing the surface plasmons to a peg extending from the enlarged part towards the media-facing surface; and
- enhancing optical intensity of the surface plasmons via a metal aperture plate at the media-facing surface, the metal aperture plate surrounding at least three sides of the end of the peg, the magnetic write pole surrounding a fourth side of the peg, the metal aperture plate shifting an electric field profile of the peg to be concentrated along a downtrack edge of the peg facing away from the write pole.

17. The method of claim 16, further comprising:
- directing the surface plasmons to create a hotspot on a recording medium; and
- activating the magnetic write pole to set a magnetic orientation in the hot spot.

18. The method of claim 17, further comprising blocking the emission of background light to the recording medium via the metal aperture plate.

19. The recording head of claim 1, wherein the metal aperture plate and the thin metal film of the near-field transducer are made of a same material.

20. The recording head of claim 1, wherein a downtrack gap and two crosstrack gaps separate the peg and the metal aperture plate, the crosstrack gaps both being approximately equal in size to the downtrack gap.

* * * * *